United States Patent [19]

Cullo et al.

[11] Patent Number: 4,705,770

[45] Date of Patent: Nov. 10, 1987

[54] METHOD OF MAKING ANATASE-TITANIA ATTRITION-RESISTANT CATALYST COMPOSITION

[75] Inventors: Leonard A. Cullo, Hempfield Township, Westmoreland County; Elliott V. Nagle, Jr., Franklin Boro; Edward F. Restelli, Jr., Oakmont Boro, all of Pa.; Thomas J. Yogan, Ft. Mitchell, Ky.

[73] Assignee: Aristech Chemical Corporation, Pittsburgh, Pa.

[21] Appl. No.: 882,874

[22] Filed: Jul. 7, 1986

[51] Int. Cl.$^4$ .................. B01J 21/06; C07C 5/25; C07D 307/89

[52] U.S. Cl. .................. 502/242; 502/178; 502/340; 502/341; 502/350; 502/351; 549/249; 585/670

[58] Field of Search .................. 502/60, 64, 177, 178, 502/242, 350, 351

[56] References Cited

U.S. PATENT DOCUMENTS

| | | | |
|---|---|---|---|
| 2,344,911 | 3/1944 | Young | 502/236 |
| 2,458,818 | 1/1949 | Young | 502/242 |
| 3,565,919 | 2/1971 | Friedrichsen et al. | 502/60 |
| 3,926,846 | 12/1975 | Ono et al. | 502/179 |
| 3,948,807 | 4/1976 | Fuchigami et al. | 502/242 |
| 4,046,780 | 9/1977 | Nakanishi et al. | 502/209 |
| 4,284,571 | 8/1981 | Sato et al. | 502/209 |
| 4,356,112 | 10/1982 | Nakanishi et al. | 502/209 |
| 4,382,022 | 5/1983 | McDaniel | 502/236 |
| 4,397,768 | 8/1983 | Felice | 502/209 |
| 4,424,320 | 1/1984 | McDaniel | 502/236 |
| 4,481,304 | 11/1984 | Sato et al. | 502/214 |
| 4,482,643 | 11/1984 | Harju et al. | 502/242 |

FOREIGN PATENT DOCUMENTS

| | | | |
|---|---|---|---|
| 76340 | 4/1975 | Australia | 502/242 |
| 1228909 | 4/1971 | United Kingdom | 502/350 |

OTHER PUBLICATIONS

"O-xylene Oxidation on $V_2O_5$—$TiO_2$"-Rusiecka et al.,-Polish Academy of Sciences, Applied Catalysis, (1984), pp. 101–110—Elsevier Science Publ.—Amsterdam.

"O-xylene Oxidation on the $V_2O_5$—$TiO_2$ Oxide System"-Gastor et al., Polish Academy of Sciences, Applied Catalysis, (1984), pp. 87–100—Elsevier Science Publ.—Amsterdam.

"Comparison of $V_2O_5/T_1O_2$ (Anatase & $V_2O_5/T_2O_2$ Rutile) Promoting Effect of-The Support"—Salek et al.,—Am. Chem. Soc.—N.Y. Meeting—Apr. 13–18, 1986.

*Primary Examiner*—P. E. Konopka
*Attorney, Agent, or Firm*—William L. Krayer

[57] ABSTRACT

A method is disclosed for preparing titania-containing catalysts and catalyst supports that are fluidizable and attrition-resistant. By the method, a fluidizable substrate is impregnated with titanyl sulfate or a related compound. The compositions may be used to advantage in applications requiring titania-bearing catalysts or titania supports and are particularly useful in preparing fluid bed catalysts for the oxidation of o-xylene and naphthalene to phthalic anhydride.

6 Claims, No Drawings

METHOD OF MAKING ANATASE-TITANIA ATTRITION-RESISTANT CATALYST COMPOSITION

TECHNICAL FIELD

Titania-bearing catalysts have a variety of applications. Some of the reactions catalyzed by titania-bearing compositions include the selective reduction of nitrogen oxides in flue gas with ammonia (useful in air pollution control), hydrodesulfurization (for example, destruction of thiophene in naphtha), liquefaction of coal by direct hydrogenation, isomerization of butenes, and the selective oxidation of hydrocarbons such as butadiene, 1-butene and benzene to maleic anhydride, naphthalene and o-xylene to phthalic anhydride, butene to acetic acid, and acetaldehyde and methanol to formaldehyde [S. Matsuda and A. Kato, *Applied Catalysis*, 8 149–165 (1983)].

Because of the exothermic nature of many of the reactions in which titania catalysts are used, it would be advantageous to conduct such reactions in a fluidized bed. Unfortunately, catalysts containing major quantities of titania have in the past had the disadvantages of poor physical integrity and poor attrition resistance when used in fluidized beds. Titania catalysts tend to break down to smaller particles under the severe impacts which occur in fluidized beds and the elutriation of these fine particles from the bed results in high catalyst losses Under certain circumstances, fine particles of titania may form agglomerates that are held together weakly by electrostatic forces; these particles are "sticky" and difficult to fluidize, resulting in poor quality fluidization.

Consequently, because of these deficiencies in the prior art, no acceptable fluidized bed titania catalysts are available. It is an object of our invention to provide a method for preparing a titania catalyst or catalyst support which has satisfactory attrition resistance for fluid bed operation.

It is a further object of this invention to provide a method of preparing a titania catalyst or titania bearing catalyst support which does not have a tendency to "stickiness" in a fluidized bed and which displays excellent quality of fluidization. By the term "quality of fluidization" is meant the ready maintenance of stable fluidized bed operation in which the temperature is uniform throughout the bed and only minor pressure fluctuations are experienced.

A still further objective is to provide a fluid bed catalyst or catalyst support with titania as a major component which exhibits substantially the chemical properties of bulk titania.

Other objects as well as features and advantages of our invention will be obvious from a study of the specifications including examples and claims.

Background Art

As early as 1962, Japanese investigators showed that superior results were obtained in the catalytic oxidation of o-xylene to phthalic anhydride using titania rather than silica as the catalyst support [H. Kakinoki, et al., *Shokubai* 4, 113 (1962), cited in M. S. Wainwright and T. N. Hoffman, *The Canadian Journal of Chemical Engineering*, 55, 557–564 (October 1977)]; later it was shown that an increase in selectivity for phthalic anhydride was associated with an increase in oxygen absorption per unit surface area [H. Kakinoki et al., *Gakkai Shi* 7 (3), 164 (1964) (cited by M. S. Wainwright and T. N. Hoffman, ibid.)]. Fifteen years later, however, M. S. Wainwright, a principal investigator and reviewer working in the field of phthalic anhydride synthesis, reported that the exact role of titania was still not understood [M. S. Wainwright and N. R. Foster, *Catal. Rev.-Sci. Eno.*, 19 (2), 211–292 (1979)]. At the same time, Wainwright stated that "titania catalysts" tend to break into fine particles, and: "It is therefore unlikely that fluid beds will be used to oxidize o-xylene unless a suitable support is found."

Titanyl sulfate ($TiOSO_4$) has been referenced in the catalyst literature in the past. See, for example, the process of U.S. Pat. No. 2,344,911 which modifies a titanyl sulfate solution in various ways for addition to dried silica gel. See also U.S. Pat. No. 2,458,818.

Ammonium titanyl sulfate is used in U.S. Pat. No. 3,926,846 to Ono et al. See also U.S. Pat. No. 3,948,807.

Titanium dioxide occurs in three polymorphic forms; rutile, anatase and brookite. Anatase is the stable form at temperatures below 700° C., and titania supports with high specific surface areas are usually prepared with anatase. Titania is typically prepared by neutralizing acidic solutions of titanium salts, which gives orthotitanic acid as an intermediate, or hydrolyzing such salts or titanate esters, which gives metatitanic acid as an intermediate; calcination of the titanic acid at between 300° and 600° C. then gives anatase. Above about 700° C., anatase is converted to rutile with sintering and a drastic decrease in surface area. If anatase is seeded with rutile, however, the anatase-to-rutile transformation can occur below 700° C.

Recently, Nishimoto et al. *Nippon Kaqaku Kaishi* (2), 246–52 246–52 (1984) [*Chemical Abstracts* 100, 112106d (1984)], prepared a series of titania powders by hydrolyzing $Ti(SO_4)_2$ and calcining the resultant $Ti(OH)_4$ slurry in the temperature range of 170° to 1000° C. The content of anatase in the powder and the corresponding crystallite size increased with temperature up to 700° C. The anatase-to-rutile transition occurred at approximately 740°–830° C. and the resulting sulfate ions in the titania powder decreased linearly with increasing temperature and disappeared completely above 800° C. The amount of hydroxyl groups located on the titania surface decreased monotonically with increasing temperature.

Significant portions of anatase-type titania are described as retained in phthalic anhydride catalysts made using ammonium titanyl sulfate and titanium hydroxide placed on a porous catalyst support of silicon carbide, in U.S. Pat. Nos. 4,046,780, 4,284,571 and 4,481,304. The anatase form is also said to be beneficial in U.S. Pat. No 4,397,768.

Titanyl sulfate is reacted with peroxide prior to addition to a silica gel in U.S. Pat. No. 4,424,320, which describes a polymerization catalyst.

None of the above-mentioned Patents, however, describes an attrition-resistant catalyst made from titanyl sulfate which can be used in a fluid bed.

A process for the production of supported catalysts for the partial oxidation of aromatic hydrocarbons in a fluidized bed is described in U.S. Pat. No. 3,565,919 to Friedrichsen et al. The catalysts are prepared by treating an inert carrier substance with a solution or suspension of a titanium compound, heating to 130 to 1300° C in the presence of oxygen, then treating with a solution or melt of a vanadium compound and heating in the presence of oxygen at 350 to 1100° C. This catalyst is described as "abrasion-resistant"; however, this assertion is not supported with data showing the rate of attrition of this catalyst in a fluidized bed at the gas velocities in ranges typically used in commercial operations.

The teachings of U.S. Pat. No. 3,565,919 also fall short of other properties vital to acceptable titania catalyst supports. Only a monomolecular layer of titania is obtained, which does not exhibit the chemical properties of bulk titania. Another important limitation encountered in following the teachings of the Friedrichsen patent is the limitation of the thermal stability of the compositions. The anatase phase of titania, which is the preferred phase for most applications, is thermally convertible to the rutile phase which is less active. Such a conversion occurs when catalyst is prepared according to Friedrichsen's teachings in less than three hours at 600° C., which indicates that the time of retention of catalytic activity would be severely reduced even at the lower temperatures employed in catalyst applications.

Disclosure of Invention

In accordance with our invention, titania-bearing material that has an acceptable attrition rate for use as a catalyst or catalyst support in commercial fluidized bed operation is provided by impregnating an attrition-resistant fluidizable substrate with a soluble acid salt of titanium. The process we use provides a stable anatase form of titania; we place the anatase titania on a fluidizable substrate that has a mean pore volume greater than 0.1 cubic centimeters per gram, and Preferably greater than 0.4 cc/gr, and that has an attrition resistance acceptable for use in a commercial fluidized bed, as will be explained in more detail herein. We may condition the substrate prior to impregnation and thereafter impregnate the substrate with an aqueous solution containing a soluble salt or mixture of salts that will yield anatase titania when pyrolyzed such as titanyl sulfate or ammonium titanyl sulfate, and then heat the impregnated substrate until it is dried. The compound or mixture is then pyrolyzed, and the resulting titania-substrate combination is stabilized.

By conditioning of the substrate is meant such treatments as pre-calcining, steam-calcining and doping or blocking, i.e. wetting the starting substrate with a relatively small quantity of a selected compound or agent such as a soluble metallic salt, hydrate, or oxide and calcining a relatively long time (i.e. 8 to 50 hours or more) to allow the component to fill vacancies in the substrate matrix. Selection of a doping agent and the amount used are well-known to those skilled in the art as discretionary variables, as is also the programmability of the preparatory steps (steaming for a specific time period at one temperature, then at another, for example), which can be used to prepare materials for further impregnation. Removal (or not) of certain particle-size fractions (for example, the "fines" or "dust") by sieving or by air-classification is also included as optional within the scope of our invention. Thus, "conditioning" is a set of optional and variable treatments intended to prepare the substrate for impregnation.

Although the rutile form of titania is desirable for some applications of titania-bearing catalyst compositions, rutile titania is generally less active as a catalyst for most applications such as the oxidation of o-xylene and naphthalene to phthalic anhydride. The process of this invention has for one of its advantages that it can be used without converting a significant portion of the titania, which is initially deposited as anatase, to rutile. Unexpectedly, the stability of the anatase form in the products of our invention is extremely high, leading to extended periods of catalyst activity. Titania-bearing compositions of our invention, when exposed to 900° C. for 8 hours show no evidence of rutile formation. At 800° C. after 80 hours, no evidence of rutile is detected when a support is prepared following the teachings of our invention. The resulting fluidizable catalytic material prepared has the advantage of combining the chemical characteristics of titania and the physical characteristics of the starting substrate. Being relatively less dense, the material fluidizes well compared to bulk titania, and the substrate, being covered with $TiO_2$, is less likely to enter into solid state chemical reactions than if it were totally exposed. The process methods of this disclosure are suitable for preparing catalysts useful in any of the chemical reactions which are promoted by titania-bearing compositions or which require a titania-bearing support. For example, material prepared by our process is particularly suitable as a support for a catalyst for the selective oxidation of o-xylene and naphthalene or mixtures thereof to produce phthalic anhydride. It is also particularly suitable as a catalyst for the isomerization of 1-butene to cis/trans 2-butene.

The term "substrate" is used herein to refer to an inorganic oxide material substantially comprising either one metal oxide or a mixture of oxides, carbides, silicates, and aluminates; in either case of the type commonly used in preparing catalysts and catalyst supports, such as silica, silica-alumina, alumina, magnesia, silica-magnesia, calcium aluminates and calcium silicates, and silicon carbides By the term "fluidizable substrate" is meant any such material which, in particulate form, will be freely supported by a fluid when the fluid is passed upward through a bed of the particles with a moderate velocity, and especially those materials known to be usable in commercial fluidized-bed operations. Generally, the particle size of a fluidizable substrate will be in the range of 60 microns to 400 microns and it will have an apparent density of 0.5 to 2.0 gm/cc.

Preferably the substrate is impregnated with the titanyl sulfate or ammonium titanyl sulfate by the "incipient wetness" technique, that is, a volume of impregnating solution is used approximately equal to the pore volume of the material to be wetted. Use of larger amounts of solution results in the formation of extra, unsupported titania which is present in the product as satellite fines on the larger, impregnated particles and, as a result, the product yields poor attrition test results.

The steps of adding the solution to the substrate and mixing until the solution is uniformly distributed in the pores can be performed batchwise or by a continuous process. Examples of suitable mixing devices include Pfaudler or Abbe rotary mixers, V-type blenders and drum mixers. Spray-driers can be used, for example, by slurrying the substrate with the impregnating solution and feeding the slurry to the spray drier. Multiple impregnations can be carried out with evaporation of water between impregnations and, to the extent desired, heating to decompose or pyrolyze the titanium-bearing compound or mixture before the final calcination step, in which the pyrolysis is completed and the composition is stabilized. The preferred final calcination temperature depends on the specific impregnating agent used as the titania source. Ammonium titanyl sulfate decomposes at about 575° C. Therefore, calcination or decomposition of this material must be conducted at this temperature or higher. At 575° C., the temperature required to complete the pyrolysis of this impregnating agent and bring the composition to a stable state may be too long to be practical, and the higher the temperature over 575° C., the shorter the time required for the process. Heating to temperatures over 900° C will accelerate the sintering of the titania, thereby reducing the surface area. For example, calcination of a composition with 37.5% $TiO_2$ on a silica substrate for 8 hours at 950° C. versus 900° C. will reduce the surface area by about 30%. Therefore, adjusting the time-temperature combination for calcination may be used to alter, within limits, the surface area of the resulting catalysts and composition of this disclosure. With ammonium titanyl sulfate as the titania source, we prefer to conduct the final calcination at 700–900° C. for a period of one-half hour or more and preferably from one to 10 hours.

Titanyl sulfate (unammoniated) was found to convert to titania at a temperature as low as 450° C. For this material, calcined 24 hours at 450° C., X-ray diffraction showed a primary anatase peak at d 3.52 of 1387 counts and a primary rutile peak of 66 counts at d 3.25 at a scan rate of 1 deg/min. Compositions utilizing titanyl sulfate as the titania source should therefore be calcined at 450° C. or higher with the preferred temperature being 550°–800° C.

It is recognized that if some rutile is desired in the catalyst or composition, then the methods described above may be modified so as to yield rutile upon final calcination of the material. This may be done most easily by adding rutile to the initial titanyl sulfate as seed material. It is also recognized that other compounds such as vanadyl sulfate, added to the titanyl sulfate in sufficient quantity, will promote the transformation of anatase to rutile—possibly overcoming the inherent thermal stability of the titania prescribed in this disclosure, thereby yielding some titania in the rutile form after calcination.

The addition of other components to the impregnating solution prior to impregnation of the substrate to obtain a specific composition or catalytic function is also within the scope of this invention, as long as the contained titania in the final composition is produced by the teachings of this disclosure and is within the $TiO_2$ composition limits described below. An example of an added component is vanadyl sulfate added to the impregnating solution, thereby producing a $V_2O_5$-$TiO_2$ composition on the starting substrate.

Examples of starting substrates which can be used for this invention include all absorbent substances which themselves have suitable attrition resistance and which may be used in a fluidized bed reactor. Common examples of such substances include silica gel, ground silica, synthetic and natural silicates, clays, alumina, magnesium and zirconium oxides, zeolites, silicon carbide, and others familiar to those skilled in the art.

We include within the term "titanyl sulfate", particularly as used in the claims herein, the titanyl sulfate discussed above as well as any of the impregnating solutions described in the following paragraphs and referred to in the examples, specifically titanyl sulfate, ammonium titanyl sulfate, hydrates and acid solutions thereof, and titania hydrate pulp.

Acid Solution of Ammonium Titanyl Sulfate ("ATS")

To prepare this impregnating solution, the first step was to hydrolyze $TiCl_4$ with water. The equipment used consisted of a 1500-millitre (ml) Pyrex beaker equipped to be stirred with a power agitator and to receive liquid from a graduated addition funnel having a long delivery tube. A bulk volume of about 300 ml of ice cubes was placed in the beaker and the void space in the bed of ice was then filled with water. The addition funnel was charged with 135 ml of $TiCl_4$ and loosely capped, vigorous stirring was started, and the $TiCl_4$ was added to the ice water over a period of about 10 minutes with the $TiCL_4$ being introduced below the surface of the liquid. During the addition, more ice was added so that the temperature of the mixture did not exceed 75° C. but so that the volume of the mixture did not exceed 600 ml. After the $TiCl_4$ addition, 67 ml of concentrated sulfuric acid was added to the mixture. Finally, 165 g of ammonium sulfate was dissolved in 165 ml of deionized water by heating, and the solution was boiled and added to the mixture in the beaker. The prepared solution had a total volume of 750–800 ml and its most likely composition was:

| | |
|---|---|
| $(NH_4)_2SO_4 \cdot TiOSO_4 \cdot 2H_2O$ | 38.4 wt % |
| water | 42.8 |
| HCl | 18.2 |

Freshly prepared solutions were allowed to cool somewhat before being used for impregnations. Stock solutions were frequently stored several days before use, however, and during this time the concentration of ATS was diminished somewhat by crystallization that occurred on standing.

Aqueous Solutions of ATS and Acid

On standing, the acid solution of ATS prepared as described deposits crystals. The mass of crystals that accumulates over several days is not readily dissolved in common solvents; however, freshly deposited crystals were found to be water soluble and appeared to be composed of 96.5 wt % ATS hydrate. A number of batches of acid solution of ATS were subsequently chilled to separate crystals which were filtered out; water solutions of the crystals were then prepared and used for impregnation.

Titanyl Sulfate Solution (TSS) from Pulp Digestion

As a titania source for the compositions of this disclosure, one may also use titania hydrate pulp, produced commercially as exemplified by National Lead of Canada by the Sulfate $TiO_2$ Process, whereby a titania-bearing ore or slag iron is digested with sulfuric acid to form hydrated titanium sulfates (pulp). The resulting product is a suspension of solids in acid solution and yields about 28.5 wt % $TiO_2$ on calcination.

The titanyl sulfate solution (TSS) was prepared by digestion of approximately one part commercial titania hydrate pulp with approximately four parts sulfuric acid, and filtered through a glass fiber mat (Whatman GF/F) to remove undigested matter that might seed titania formation toward the rutile form. This solution, upon calcination, yields about 10% $TiO_2$.

Peroxide-Treated TSS

This impregnating solution was prepared by adding 39 ml of 30% strength hydrogen peroxide to 30 ml of TSS; this impregnating solution, prepared in a manner similar to U.S. Pat. No. 4,382,022, was red-brown in color.

Aqueous Titanyl Sulfate Solution

After several months of shelf storage, the TSS described above deposited the bulk of its solute as the water-soluble dihydrate, $TiOSO_4 \cdot 2H_2O$. To prepare an aqueous solution of the dihydrate for impregnating purposes, a quantity of the crystals was separated by filtration, washed on the filter with acetone, and dissolved in deionized water. This solution differs from the TSS in that it does not contain sulfuric acid as a major component.

Aqueous Crude Titanyl Sulfate Solution

An aqueous solution of the crude titanyl sulfate dihydrate was prepared as follows: TSS was heated to evaporate a substantial portion of the acid, leaving a solid residue that consisted of the dihydrate and tightly held acid. The residue was then extracted with methanol to remove an additional portion of the acid and the extracted residue was dissolved in water to prepare an impregnating solution.

Concentrated Titanyl Sulfate Solution

Approximately 250 ml conc. sulfuric acid was added to 367 g of titania hydrate pulp containing 28% equivalent $TiO_2$. The mixture was maintained at 180° C. for approximately one hour to solubilize most of the hydrate pulp. The material was cooled and yielded 18 weight percent $TiO_2$ on calcination.

Diluted Titania Hydrate Pulp

For this solution, titania hydrate pulp is diluted with water and stirred to ensure good dispersion of the pulp. This solution as a titania source is best suited for supports or substrates with large pore diameters, i.e., about 500 angstroms.

The above-described variations of titanyl sulfate solutions are used to impregnate a class of attrition-resistant "starting substrates."

Anatase Titania Compositions

The preferred supported titania compositions of this disclosure exhibited strong anatase X-ray peaks with no trace of rutile and were only obtained when titanyl sulfate and ammonium titanyl sulfate solutions described above were used as impregnating agents. The primary $TiO_2$ anatase X-ray peak at d 3.52 using Cu K-a radiation was observed when the percent $TiO_2$ in the composition reached the detectable limit of the X-ray technique—approximately 2% $TiO_2$. At a constant scan rate, the magnitude of the peak increased with increasing $TiO_2$, and was sharper for compositions calcined at higher temperatures, e.g., 800° C. and higher, indicating the presence of large titania crystallites, and broader for samples calcined at lower temperatures, e.g., 600°–650° C., indicating the presence of smaller crystallites. The range of $TiO_2$ for the compositions covered by this disclosure is 2 to 95% $TiO_2$ with the preferable range being 15–55%.

Attrition Resistance

Attrition in a fluid bed reactor is the breakdown of particles in the bed, thereby producing fines which leave the reactor by elutriation. The mechanism for elutriation is well defined. Gas passing through the bed first stratifies the solids, carrying fines to the surface, after which they are picked up and carried out of the reactor. Elutriation rates can increase as bed-component particle size increases because beds with larger particles have higher voids, and hence the fines present are more easily carried to the surface of the bed. Elutriation rates then increase as particle size at the bed surface and particle density decrease or fluid velocity increases Elutriation rates are related to Stokes' law and most correlations reflect the mass and diameter of the particles, the viscosity and velocity of the fluid and a drag coefficient which in part depends upon particle shape..

The phenomena of attrition depend on the mechanical strength as well as the physical form of the particles, in addition to the parameters of the system. Ground particles with irregular shapes and rough edges will be subject to higher attrition rates than smooth spherical particles. Attrition rates must be determined by an appropriate experimental attrition test. One such attrition test accepted in the industry is described in the 1957 pamphlet "Test Methods for Synthetic Fluid Cracking Catalysts" (pp. 42–49) by American Cyanamid Corporation, which is incorporated herein by reference. In the test, three air jets having velocities of approximately 890 ft/sec. impart high motion to the particles causing collisions which cause attrition. The fines generated by the process are carried from the unit by elutriation. The amount of attrited or overhead material per unit time is defined as the attrition rate. This parameter can be correlated with the catalyst make-up rate in a commercial fluidized bed reactor due to attrition. Equipment such as described above was used to measure the attrition rates of the materials produced by the methods of this disclosure. Examples 15 through 19 hereafter recite the results of attrition tests.

The normal test time is 45 hours although several extended tests for 100+ hours were also conducted. Fifty grams of sample were charged to the tube of the unit. The samples were presized at −80, +325 mesh by dry screening, this being the initial size range for fluidized bed catalysts before breakdown. However, some finer material clinging to the larger particles survived the screening and thus constituted the initially elutriated fines in the test. This was the material collected overhead after 5 hours. The rate of attrition of a tested material was determined after elutriation of the initial fines and when an essentially constant rate was reached by constructing a tangent to the plot of wt % overhead vs. time.

Best Mode of the Invention

EXAMPLE 1

Eighty-five grams of ground silica, sized approximately −80, +325 mesh and having a surface area of approximately 230 m²/g and a pore volume of 1.15 cc/g were impregnated by wetting four times with 103, 103, 91, and 85 ml with an acid solution of ammonium titanyl sulfate, decomposing the absorbed solution after each of the first three wettings by placing the material for one hour in a 740°–750° C. furnace, and, after the fourth wetting, calcining the material for 8 hours at 900° C. The percentage of TiO$_2$ was 38.6 percent by weight Surface area of the final composition was 110 m$^2$/g and pore volume was 0.66 cc/g.

EXAMPLE 2

One hundred grams of the silica as used in Example 1 was wetted 5 times with 133, 117, 105, 92, and 78 ml aqueous solution of ammonium titanyl sulfate and acid containing 1.1% vanadyl sulfate, drying each time by heating 2½ to 16 hours at temperatures up to 200° C., and finally calcining four hours at 800° C. The final composition was 61.7% SiO$_2$, 37.5% TiO$_2$, and 2.1% V$_2$O$_5$. The V/TiO$_2$ mole ratio was 0.049 and 4.6% of the starting silica was dehydroxylated. Surface area, pore volume, and median pore diameter of the resulting composition were 119 m$^2$/g, 0.64 cc/g, and 206 A$^O$, respectively.

EXAMPLE 3

One hundred fifty grams of the silica as used in Example 1 was wetted with 180, 180, 88, 82, and 76 ml of an acid solution of ammonium titanyl sulfate. After each of the first four wettings, the material was dried in a forced-draft oven at 150° C. for one to 1½ hours, then heated in air in a furnace at 750° C. for two hours. After the last wetting, the material was dried at 150° C. and calcined 7½ hours in air at 800° C. The material contained 38.7% TiO$_2$ and exhibited a BET surface area of 111 m$^2$/g, mean pore diameter of 202 A$^O$, and pore volume of 0.60 cc/g. X-ray diffraction showed 1333 anatase counts at d 3.52 and zero rutile counts at d 3.25 at a scan rate of 1 deg/min.

EXAMPLE 4

Seventy-five grams of the silica as used in Example 1 was wetted with an acid solution of ammonium titanyl sulfate prepared as described and subjected to thermal decomposition by placing in air in a 750° C. furnace for one hour. This cycle was repeated three times with 90, 81, and 75 ml of solution and after the last cycle the batch was calcined in air 8 hours at 800° C. The calcined material contained 38.9% TiO$_2$, BET surface area of 138 m$^2$/g, mean pore diameter of 208 A$^O$, and pore volume of 0.64 cc/g. X-ray diffraction studies showed 1230 anatase counts and no rutile detectable.

EXAMPLES 5, 6, and 7

Fifty grams of the material of example 4 was wetted and heated for decomposition an additional four times using 33, 32, 30, and 28 ml of solution, then divided into portions—Examples 5, 6, and 7—that were calcined in air 8, 16, and 24 hours, respectively. These materials contained about 51.7% TiO$_2$, exhibited BET surface areas of 81–91 m$^2$/g, mean pore diameters of 211 A$^O$, and pore volumes of 0.42 to b 0.43 cc/g. X-ray diffraction counts for anatase ranged from 1346 to 1385 and no rutile was detected.

EXAMPLES 8, 9, and 10

To prepare these compositions, 75 grams of the silica used in Example 1 was first calcined 64 hours in air at 800° C., during which it lost 6.37 wt % and its pore volume decreased to 1.25 cc/g. The calcined silica was then wetted with an acid solution of ammonium titanyl sulfate prepared as described and heated one hour in air at 750° C. The wetting/one-hour heating sequence was then repeated eight times. The volumes of solution used for the first four wettings were 90, 90, 81, and 75 ml. After the fourth wetting and decomposition, 47.6 g of the resulting material was wetted four additional times with 33, 32, 30, and 28 ml of solution with each wetting followed by a thermal decomposition. After the last cycle the material was split into portions being Examples 8, 9, and 10, which were calcined in air at 800° C. for 8, 16, and 24 hours, respectively. All three products contained about 52% TiO$_2$, showed BET surface areas of about 83 m$^2$/g, and mean pore diameters between 203 and 212 A$^O$. Anatase X-ray counts ranged from 1292 to 1479 and no rutile was detected.

EXAMPLES 11, 12, and 13

To prepare these compositions, 100 grams of the silica used in Example 1 was first wetted with 120 ml of an acid solution of ammonium titanyl sulfate prepared as described above, then dried by heating 2½ to 3½ hours at 150° C. in a forced draft oven. This cycle was repeated three additional times using 94, 77, and 57 ml of solution, and after the fourth cycle the material was calcined 7½ hours in air at 800° C. This first-stage material contained 31% TiO$_2$, showed a surface area of 146 m$^2$/g, mean pore diameter of 196 A$^O$, and pore volume of 0.74 cc/g. X-ray diffraction showed 750 counts for anatase and none for rutile. The first stage material was then wetted four times with 62, 50, 36, and 23.5 ml of the acid solution of ammonium titanyl sulfate and dried one hour at 150° C. after each wetting. The batch was then divided into three portions: Examples 11, 12, and 13, which were calcined in air at 650° C. for 2, 4, and 21 hours, respectively. All three calcined materials contained 45–46% TiO$_2$ and showed BET surface areas of about 115 to 118 m$^2$/g, mean pore diameters of 200 to 212 A$^O$, and pore volumes of 0.57 cc/g. All showed about 1238 X-ray counts for anatase at d 3.52, and zero counts for rutile at d 3.25 at a scan rate of 1 deg/min.

EXAMPLE 14

Two batches of acid solution of ammonium titanyl sulfate prepared as described above were cooled in an ice bath, depositing crystals which were filtered out. The crystals were dissolved in deionized water to yield a 50.7% solution that contained 25.7% ammonium titanyl sulfate hydrate; this was used as an impregnating solution for the first wetting. For use in subsequent wettings a second impregnating solution was prepared by adding vanadyl sulfate to a portion of the first solution to provide a vanadyl sulfate concentration of 2% and heating the mixture several hours at 60 to 70° C., producing a dark green-colored solution.

Sixty grams of the silica employed in Example 1 was wetted with 80 ml of the first solution, then dried three hours at 150° C. in a forced draft oven. Six additional wettings were then made using 60, 56, 49, 42, 43, and 38 ml of the second solution and the material was similarly dried after each wetting. After the final wetting the material was calcined four hours in air at 800° C. Analysis showed the product contained 36.8% TiO$_2$ and 1.5% vanadium, had a BET surface area of 118 m$^2$/g, mean pore diameter of 222 A$^O$, and a pore volume of 0.60 cc/g. X-ray diffraction showed 1285 counts for anatase and zero for rutile.

EXAMPLE 15

One hundred and seven grams of the silica used in Example 1 was wetted three times with 81, 75, and 75 ml of ammonium titanyl sulfate acid solution prepared as described above. The material was dried at 150° C. for one hour and heated for 2 hours at 750° C. after each of the first two wettings.

After the final wetting, the material was dried at 150° C. and calcined for 10 hours at 750° C. Surface area, pore volume, and median pore diameter of the resulting composition were 100 m$^2$/g, 0.49 cc/g, and 208 A$^O$, respectively. Anatase X-ray count at d 3.52 was 1657 at a scan rate of 1 deg/min with no rutile detected.

Fifty grams of this composition sized $-80$, $+325$ mesh was then charged to the attrition apparatus described above and an initial fines content of 4.2% and an attrition rate of 0.49%/hr were measured for the material.

EXAMPLE 16

Three hundred ninety-seven grams of titania hydrate pulp (titanyl sulfate hydrate) received from NL Chemicals was diluted with 121 g of deionized water yielding an impregnating solution of density 1.2 g/cc. One hundred grams of the silica employed in Example 1 were wetted with 120 ml of the diluted pulp solution and the material was dried for 2 hours at 150° C. The material was again wetted with 152 ml of solution, dried for 2 hours at 150° C., and calcined for 2 hours at 550° C. Surface area, pore volume, and median pore diameter of the resulting composition containing 49.2% TiO$_2$ were 154 m$^2$/g, 1.0 cc/g, and 226 A$^O$, respectively. Anatase X-ray counts for the material measured at d 3.52 were 905 and no rutile was detected.

A portion of the above dried but uncalcined composition was calcined for 2 hours at 650° C. Fifty grams of this composition sized $-80$, $+325$ mesh was charged to the above described attrition test and initial fines content of 3.5% and an attrition rate of 0.26%/hr were measured for this material.

EXAMPLE 17

Eighty-five grams of the silica of Example 1 were wet 4 times with 103, 103, 91, and 85 ml of ammonium titanyl sulfate solution and heated for about one hour between wettings to decompose the titania-bearing salts. The final composition was calcined for 8 hours at 900° C., producing a composition containing 38.6% TiO$_2$ with surface area, pore volume, and median pore diameter of 110 m$^2$/g, 0.62 cc/g, and 232 A$^O$, respectively. Fifty grams, sized $-80$, $+325$ mesh were charged to the above-described attrition test unit and intial fines of 4.2% and an attrition rate of 0.36%/hr were determined for the material.

EXAMPLE 18

Seventy-five grams of the silica of Example 1 were wet 5 times with 100, 88, 71, 61, and 56 ml of concentrated titanyl sulfate solution prepared according to procedure described above. The material was heated one hour at 650° C. between wettings to decompose the titania-bearing salt and final calcination was for 4 hours at 650° C. The resulting composition contained approximately 46.9% TiO$_2$. Fifty grams of this material, sized $-80$, $+325$ mesh, were charged to the above-described attrition test unit and an initial fines content of 4.5% and attrition rate of 0.4%/hr were determined for the composition.

EXAMPLE 19

Two hundred eighty-five grams of the silica used in Example 1 were first wetted with 380 ml of acid solution of ammonium titanyl sulfate as a doping treatment and calcined 64 hours at 800° C. The resulting material, containing approximately 19% TiO$_2$ was then wetted 3 additional times with 294, 290, and 275 ml of the above solution with intermediate heating of one hour at 800° C., followed by a final calcination of 8 hours at 800° C. The resulting composition contained 41.4% TiO$_2$ and exhibited a surface area, pore volume, and median pore diameter of 105 m$^2$/g, 0.6 cc/g, and 221 A$^O$, respectively. Fifty grams sized $-80$, $+325$ mesh were then charged to the above-described attrition test unit and an initial fines content of 5.1% and attrition rate of 0.3%/hr were measured.

One gram of this composition was then charged to a micro-catalytic reactor and heated to 280° C. The reactor was purged with nitrogen and 1-butene at a feed-to-catalyst ratio of 0.54 wt/wt-hr was passed over the catalyst. Reactor off-gas was analyzed by gas chromatography using a 60 meter fused silica capillary column coated with SPB-1 di-methyl polysiloxane stationary phase. A flame ionization detector was used for analysis of contained hydrocarbons. Product gas composition showed approximately 82% conversion of the 1-butene to 2-butene, with the cis isomer component being about 50%, and the trans isomer component being about 32%.

The reactor containing the above-described catalyst composition was then removed and replaced with an empty tube. 1-Butene was then passed through the tube at the same volumetric flow rate as used with the catalyst and at 280° C. The reactor off-gas was again analyzed by the above chromatographic technique and showed only 1-butene with no conversion to 2-butene.

We claim:

1. Method of making a catalyst or catalyst support consisting essentially of impregnating an attrition resistant, porous substrate having a pore volume greater than 0.1 cc/g with from 2 to 95% TiO$_2$ by wetting the substrate with a solution of a titanyl sulfate, drying the impregnated substrate, heating it to decompose the titanyl sulfate, and calcining the resulting impregnated composition at a temperature of at least 450° C. to obtain a calcined composition which displays essentially the characteristics of anatase titania as shown by an anatase X-ray peak at d 3.52 and no rutile X-ray peak at d 3.25.

2. Method of claim 1 wherein the TiO$_2$ included in the composition is 15–55%.

3. Method of claim 1 wherein the impregnating solution consists essentially of titanyl sulfate or ammonium titanyl sulfate.

4. Method of claim 1 wherein the titanyl sulfate is ammonium titanyl sulfate and the calcination is conducted at a temperature of at least 575° C.

5. Method of claim 1 wherein the titanyl sulfate is not ammoniated and calcination is conducted at a temperature of at least 450° C.

6. Method of claim 1 wherein the resulting final composition has an attrition rate of less than 1%/hr. on impingement of three air jets carrying particles of the composition at a velocity of about 890 ft/second.

UNITED STATES PATENT AND TRADEMARK OFFICE
CERTIFICATE OF CORRECTION

PATENT NO. : 4,705,770

DATED : Nov. 10, 1987

INVENTOR(S) : Leonard A. Cullo et al

It is certified that error appears in the above-identified patent and that said Letters Patent is hereby corrected as shown below:

The term of this patent subsequent to November 10, 2004, has been disclaimed.

Signed and Sealed this

Fifteenth Day of August, 1989

Attest:

DONALD J. QUIGG

Attesting Officer      Commissioner of Patents and Trademarks